US009103096B2

(12) United States Patent
Kondo

(10) Patent No.: US 9,103,096 B2
(45) Date of Patent: Aug. 11, 2015

(54) OPERATING OIL TEMPERATURE CONTROLLER FOR HYDRAULIC DRIVE DEVICE

(75) Inventor: Satomi Kondo, Tsuchiura (JP)

(73) Assignee: Hitachi Construction Manchinery Co., Ltd., Tokyo (JP)

( * ) Notice: Subject to any disclaimer, the term of this patent is extended or adjusted under 35 U.S.C. 154(b) by 771 days.

(21) Appl. No.: 13/390,652

(22) PCT Filed: Feb. 24, 2010

(86) PCT No.: PCT/JP2010/052897
§ 371 (c)(1), (2), (4) Date: Feb. 15, 2012

(87) PCT Pub. No.: WO2011/021405
PCT Pub. Date: Feb. 24, 2011

(65) Prior Publication Data

US 2012/0144817 A1 Jun. 14, 2012

(30) Foreign Application Priority Data

Aug. 17, 2009 (JP) ................................ 2009-188486

(51) Int. Cl.
*F16D 33/02* (2006.01)
*E02F 9/22* (2006.01)
(Continued)

(52) U.S. Cl.
CPC ................ *E02F 9/2235* (2013.01); *B66F 9/22* (2013.01); *E02F 9/2095* (2013.01); *E02F 9/226* (2013.01); *E02F 9/2296* (2013.01); *F15B 21/042* (2013.01)

(58) Field of Classification Search
CPC .................................................... F15B 21/042
USPC ........................................................... 60/456
See application file for complete search history.

(56) References Cited

U.S. PATENT DOCUMENTS

2006/0021340 A1 2/2006 Vigholm et al.
2006/0042240 A1 3/2006 Sporer et al.
(Continued)

FOREIGN PATENT DOCUMENTS

JP 3516984 B2 4/2004
JP 2006-84022 A 3/2006
(Continued)

OTHER PUBLICATIONS

International Search Report dated Apr. 20, 2010 including English-language translation (Eight (8) pages).

*Primary Examiner* — Edward Look
*Assistant Examiner* — Daniel Collins
(74) *Attorney, Agent, or Firm* — Crowell & Moring LLP

(57) ABSTRACT

A control unit for controlling a flow rate control valve includes a first computing unit for determining an energy component that heats hydraulic oil, a first setting unit for setting a second relationship between a flow rate through an oil cooler and the energy component based on an experimentally or empirically known, first relationship between flow rate through the oil cooler and an amount of oil cooler heat radiation as derived by replacing the amount of oil cooler heat radiation in the first relationship to the energy component, and a second computing unit for determining the flow rate through the oil cooler based on the energy component determined by the first computing unit and the second relationship. The control unit controls the flow rate control valve according to the flow rate determined by the second computing unit.

2 Claims, 5 Drawing Sheets

(51) Int. Cl.
*B66F 9/22* (2006.01)
*E02F 9/20* (2006.01)
*F15B 21/04* (2006.01)

(56) References Cited

U.S. PATENT DOCUMENTS

2006/0236689 A1 10/2006 Kim
2009/0217656 A1 * 9/2009 Yoshimoto et al. ............. 60/456

FOREIGN PATENT DOCUMENTS

| | | | |
|---|---|---|---|
| JP | 2006-523808 | A | 10/2006 |
| JP | 2006-299795 | A | 11/2006 |
| JP | 2007-211843 | A | 8/2007 |
| JP | 2009-168143 | A | 7/2009 |

* cited by examiner

OPERATING OIL TEMPERATURE CONTROLLER FOR HYDRAULIC DRIVE DEVICE

TECHNICAL FIELD

The present invention relates to a hydraulic oil temperature control system for hydraulically-driven equipment arranged on a construction machine, such as a hydraulic excavator, subjected to severe load fluctuations.

BACKGROUND ART

As a conventional hydraulic oil temperature control system for hydraulically-driven equipment, there is the system disclosed in Patent Document 1. This conventional technology is applied to hydraulically-driven equipment of a construction machine having an engine, a hydraulic pump, a hydraulic actuator, a directional control valve, a return passage to a hydraulic oil reservoir, and an oil cooler arranged in the return passage, is comprised of a non-cooling passage bypassing the oil cooler arranged in the return passage, a flow rate control valve, specifically a solenoid on/off valve arranged in the non-cooling passage to control a flow rate of hydraulic oil flowing through the non-cooling passage, a control unit for outputting a control signal to control the solenoid on/off valve, and a temperature sensor for sensing the temperature of the hydraulic oil on an upstream side of the oil cooler, and controls the solenoid on/off valve based on the oil temperature sensed by the temperature sensor. By opening or closing the solenoid on/off valve to change flow division between a cooling passage and the non-cooling passage, the amount of heat radiation from the oil cooler is controlled.

PRIOR ART DOCUMENT

Patent Document

Patent Document 1: JP-B-3516984

DISCLOSURE OF THE INVENTION

Problem to be Solved by the Invention

According to the above-mentioned conventional technology, a time lag occurs between a change of an energy component, which heats the hydraulic oil, and a change in oil temperature measured at upstream side of the oil cooler. Because of the above-mentioned time lag found in the hydraulic pump, a difference hence arises between the energy component and the amount of heat radiation from the oil cooler controlled based on the measured oil temperature so that cooling becomes too much or too little. It is, therefore, difficult to maintain the oil temperature constant. Accordingly, the conventional technology involves a potential problem in that the operation of the hydraulic pump, hydraulic actuator and the like may become unstable due to changes in the viscosity of the hydraulic oil as caused by changes in oil temperature.

With such an actual situation of the conventional technology in view, the present invention has as an object thereof the provision of a hydraulic oil temperature control system for hydraulically-driven equipment, which can control fluctuations small in the temperature of hydraulic oil.

Means for Solving the Problem

To achieve this object, a hydraulic oil temperature control system according to the present invention for hydraulically-driven equipment having an engine, a hydraulic pump drivable by the engine, a hydraulic actuator drivable by pressure oil delivered from the hydraulic pump, a directional control valve for controlling a flow of pressure oil to be fed to the hydraulic actuator, a return passage communicating the directional control valve and a hydraulic oil reservoir with each other to guide return oil from the hydraulic actuator to the hydraulic oil reservoir, and an oil cooler arranged in the return passage, said system being provided with a non-cooling passage bypassing the oil cooler arranged in the return passage, a flow rate control valve arranged in the non-cooling passage to control a flow rate of hydraulic oil flowing through the non-cooling passage, and a control unit for outputting a control signal to control the flow rate control valve, is characterized in that in the control unit comprises a first computing means for determining an energy component that heats the hydraulic oil, a first setting means for setting a second relationship between a flow rate through the oil cooler and the energy component as set corresponding to an experimentally or empirically known, first relationship between the flow rate through the oil cooler and an amount of heat radiation from the oil cooler and as derived by replacing the amount of heat radiation from the oil cooler in the first relationship to the energy component, a second computing means for determining the flow rate through the oil cooler based on the energy component determined by the first computing means and the second relationship set by the first setting means, a second setting means for setting a third relationship between the flow rate through the oil cooler and the flow rate through the flow rate control valve, a third computing means for determining the flow rate through the flow rate control valve based on the flow rate through the oil cooler as determined by the second computing means and the third relationship set by the second setting means, and an output means for outputting to the flow rate control valve a control signal corresponding to the flow rate through the flow rate control valve as determined by the third computing means.

In the present invention constructed as described above, the energy component, which is used in the computation at the control unit for the control of the flow rate control valve arranged in the non-cooling passage bypassing the oil cooler, and the experimentally or empirically known amount of heat radiation from the oil cooler are equivalent to each other. Therefore, the value of the control signal that controls the flow rate control valve is a value that does not cause a time lag, thereby making it possible to control fluctuations small in the temperature of hydraulic oil.

The hydraulic oil temperature control system according to the present invention may also be characterized in that in the above-described invention, the control unit further comprises a fourth computing means for determining an output of the engine, a fifth computing means for determining work of the hydraulic actuator, and a third setting means for setting a fourth relationship between the output of the engine plus the work of the hydraulic actuator and the energy component, and the first computing means of the control unit determines the energy component based on the output of the engine as determined by the fourth computing means, the work of the hydraulic actuator as determined by the fifth computing means, and the fourth relationship set by the third setting means. According to the present invention constructed as described above, the determination of both of the output from the engine by the fourth computing means and the work of the hydraulic actuator by the fifth computing means can determine, from the fourth relationship set by the third setting means, the energy element that heats the hydraulic oil and corresponds to the amount of heat radiation from the oil cooler.

The hydraulic oil temperature control system according to the present invention may also be characterized in that in the above-described invention, the control unit further comprises a fifth computing means for determining work of the hydraulic actuator, a sixth computing means for determining an input to the hydraulic pump, and a fourth setting means for setting a fifth relationship between the work of the hydraulic actuator plus the input to the hydraulic pump and the energy component, and the first computing means of the control unit determines the energy component based on the work of the hydraulic actuator as determined by the fifth computing means, the input to the hydraulic pump as determined by the sixth computing means, and the fifth relationship set by the fourth setting means. According to the present invention constructed as described above, the computation of both of the work of the hydraulic actuator by the fifth computing means and the input to the hydraulic pump by the sixth computing means can determine, from the fifth relationship set by the fourth setting means, the energy element that heats the hydraulic oil and corresponds to the amount of heat radiation from the oil cooler.

Advantageous Effects of the Invention

In the present invention, the control unit, which controls the flow rate control valve arranged in the non-cooling passage bypassing the oil cooler, includes a first computing means for determining an energy component that heats the hydraulic oil, a first setting means for setting a second relationship between a flow rate through the oil cooler and the energy component as set corresponding to an experimentally or empirically known, first relationship between the flow rate through the oil cooler and an amount of heat radiation from the oil cooler and as derived by replacing the amount of heat radiation from the oil cooler in the first relationship to the energy component, a second computing means for determining the flow rate through the oil cooler based on the energy component determined by the first computing means and the second relationship set by the first setting means, a second setting means for setting a third relationship between the flow rate through the oil cooler and the flow rate through the flow rate control valve, a third computing means for determining the flow rate through the flow rate control valve based on the flow rate through the oil cooler as determined by the second computing means and the third relationship set by the second setting means, and an output means for outputting to the flow rate control valve a control signal corresponding to the flow rate through the flow rate control valve as determined by the third computing means. Accordingly, the energy component, which is used in the computation at the control unit, is equivalent to the experimentally or empirically known amount of heat radiation from the oil cooler, and thus, the value of the control signal which controls the flow rate control valve is a value that does not cause a time lag, thereby making it possible to control fluctuations small in the temperature of hydraulic oil. Therefore, the hydraulic oil temperature control system according to the present invention can control fluctuations small in the viscosity of hydraulic oil, and can realize operational stabilization of the hydraulic pump and hydraulic actuator.

MODES FOR CARRYING OUT THE INVENTION

Embodiments of the hydraulic oil temperature control system according to the present invention for the hydraulically-driven equipment will hereinafter be described based on the drawings.

Figure 1:
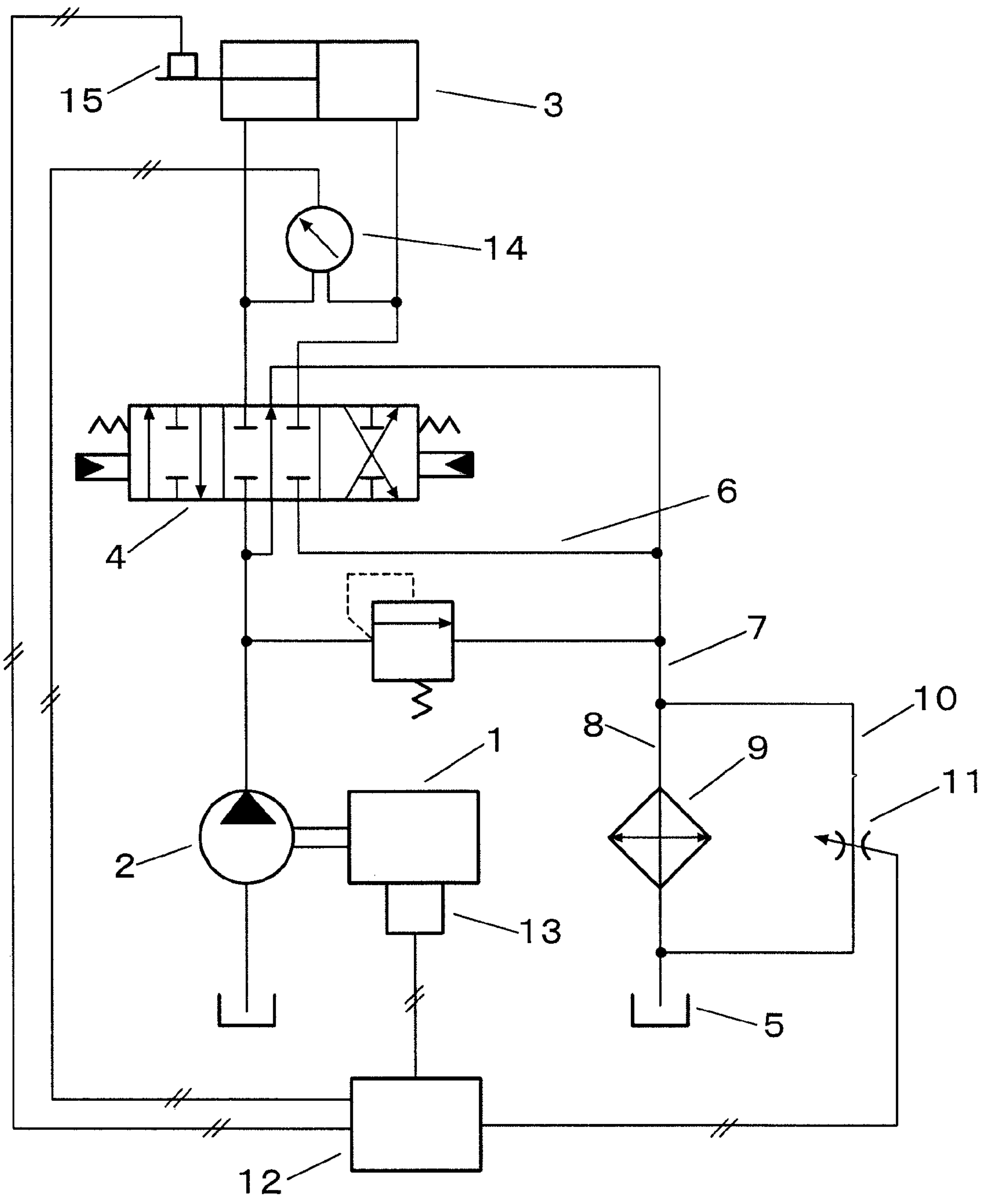
FIG. 1 is a hydraulic circuit diagram showing a first embodiment of the hydraulic oil temperature control system according to the present invention for the hydraulically-driven equipment.
Figure 2:
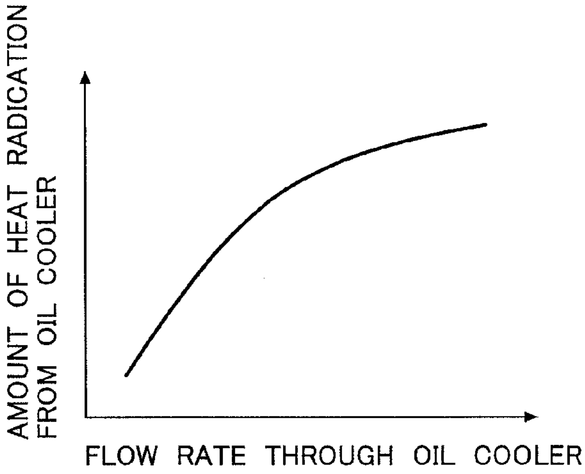
FIG. 2 is a diagram illustrating an experimentally or empirically known relationship between a flow rate through an oil cooler and an amount of heat radiation from the oil cooler.
Figure 3:
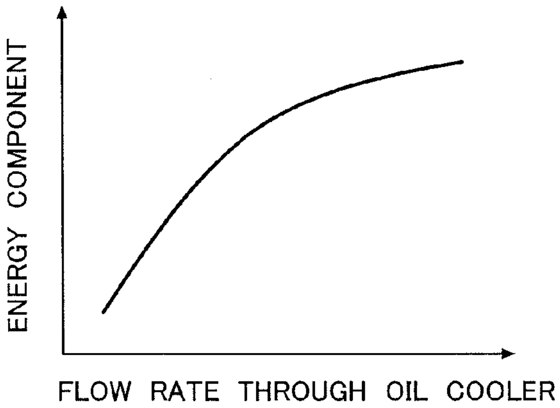
FIG. 3 is a diagram illustrating a relationship between the flow rate through the oil cooler and an energy component, which heats hydraulic oil, as set by a first setting means included in a control unit arranged in the first embodiment.
Figure 4:
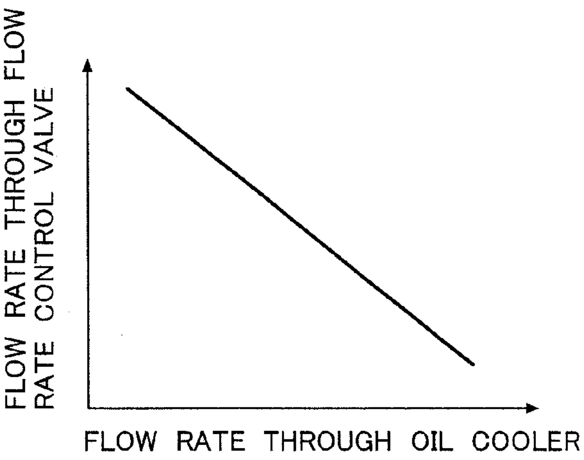
FIG. 4 is a diagram illustrating a relationship between the flow rate through the oil cooler and a flow rate through a flow rate control valve as set by a second setting means included in the control unit arranged in the first embodiment.
Figure 5:
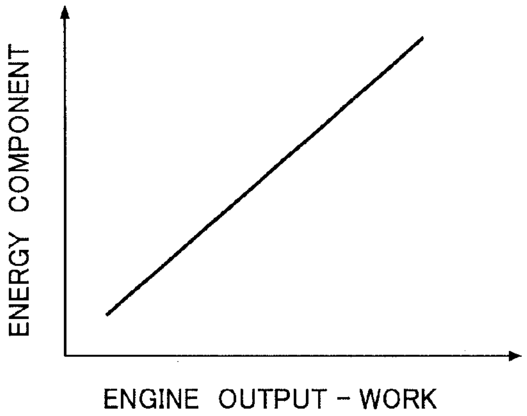
FIG. 5 is a diagram illustrating a relationship between an output from an engine plus work of an actuator and the energy component, which heats hydraulic oil, asset by a third setting means included in the control unit arranged in the first embodiment.
Figure 6:
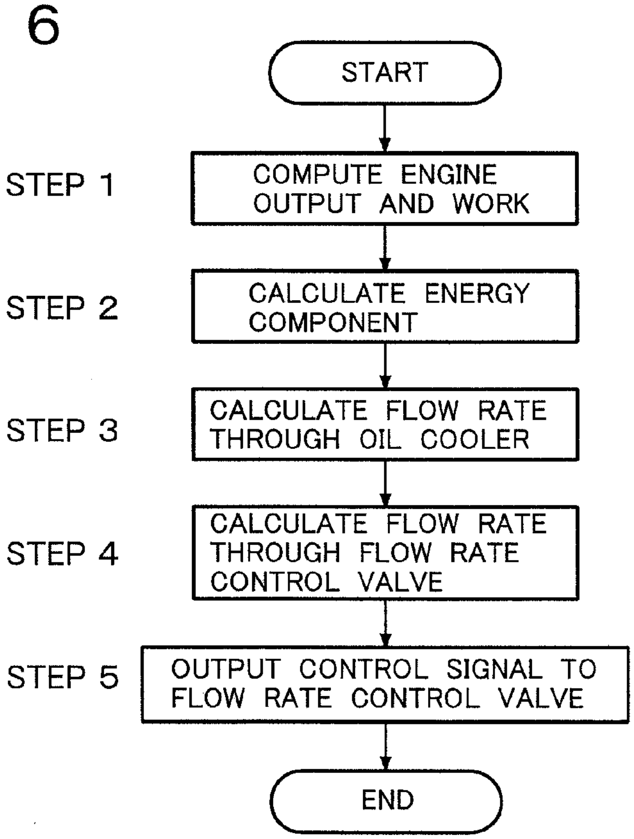
FIG. 6 is a flowchart depicting a processing procedure at the control unit arranged in the first embodiment.

FIG. 1 is a hydraulic circuit diagram showing a first embodiment of the hydraulic oil temperature control system according to the present invention for the hydraulically-driven equipment, FIG. 2 is a diagram illustrating an experimentally or empirically known relationship between a flow rate through an oil cooler and an amount of heat radiation from the oil cooler, FIG. 3 is a diagram illustrating a relationship between the flow rate through the oil cooler and an energy component, which heats hydraulic oil, as set by a first setting means included in a control unit arranged in the first embodiment, FIG. 4 is a diagram illustrating a relationship between the flow rate through the oil cooler and a flow rate through a flow rate control valve as set by a second setting means included in the control unit arranged in the first embodiment, FIG. 5 is a diagram illustrating a relationship between an output from an engine plus work of an actuator and the energy component, which heats hydraulic oil, as set by a third setting means included in the control unit arranged in the first embodiment, and FIG. 6 is a flow chart depicting a processing procedure at the control unit arranged in the first embodiment.

Hydraulically-driven equipment of a construction machine, for example, hydraulically-driven equipment of a hydraulic excavator, which is provided with the hydraulic oil temperature control system according to the first embodiment, has, as shown in FIG. 1, an engine 1, a hydraulic pump 2 drivable by the engine 1, a hydraulic actuator 3 drivable by pressure oil delivered from the hydraulic pump 2, a directional control valve 4 for controlling a flow of pressure oil to be fed to the hydraulic actuator 3, a passage 6, return passage 7 and cooling passage 8 communicating the directional control valve 4 and a hydraulic oil reservoir 5 with each other to guide return oil from the hydraulic actuator 3 to the hydraulic oil reservoir 5, and an oil cooler 9 arranged in the cooling passage 8. The hydraulic oil temperature control system according to the first embodiment, which is arranged in such hydraulic drive equipment of the hydraulic excavator, is provided with a non-cooling passage 10 bypassing the oil cooler 9, a flow rate control valve 11 arranged in the non-cooling passage 10 to control the flow rate of hydraulic oil, a control unit 12 for outputting a control signal to control the flow rate control valve 11, a sensor 13 for sensing a torque and rotational speed of the engine 1, a pressure sensor 14 for sensing a pressure of the hydraulic actuator 3, and a displacement sensor 15 for sensing a displacement of the hydraulic actuator 3. These sensors 13,14,15 send sensed values to the control unit 12.

On the other hand, the control unit 12 includes a first computing means for determining an energy component that heats the hydraulic oil, a first setting means for setting a second relationship of FIG. 3 between a flow rate through the oil cooler 9 and the energy component as set corresponding to an experimentally or empirically known, first relationship of FIG. 2 between the flow rate through the oil cooler 9 and an amount of heat radiation from the oil cooler 9 and as derived by replacing the amount of heat radiation from the oil cooler 9 in the first relationship to the energy component, a second computing means for determining the flow rate through the oil cooler 9 based on the energy component determined by the first computing means and the second relationship set by the first setting means, a second setting means for setting a third relationship of FIG. 4 between the flow rate through the oil cooler 9 and the flow rate through the flow rate control valve 11, a third computing means for determining the flow rate through the flow rate control valve 11 based on the flow rate through the oil cooler 9 as determined by the second computing means and the third relationship set by the second setting means, and an output means for outputting to the flow rate control valve 11 a control signal corresponding to the flow rate through the flow rate control valve 11 as determined by the third computing means. The control unit 12 also includes a fourth computing means for determining an output of the engine 1 based on sensed values outputted from the sensor 13, a fifth computing means for determining work of the hydraulic actuator 3 based on sensed values outputted from the sensors 14,15, and a third setting means for setting a fourth relationship of FIG. 5 between the output of the engine 1 plus the work of the hydraulic actuator 3 and the energy component.

In this first embodiment, the first computing means is configured to determine the energy component, for example, based on the output of the engine 1 as determined by the fourth computing means, the work of the hydraulic actuator as determined by the fifth computing means, and the fourth relationship set by the third setting means.

According to the control unit 12 arranged in the first embodiment constructed as described above, the output of the engine 1 and the work of the hydraulic actuator 3 are first computed based on an engine torque and engine rotational speed as sensed values of the sensor 13 and a pressure and displacement of the hydraulic actuator 3 as sensed values of the sensors 14,15, respectively, as depicted in FIG. 6 (step 1). Based on the relationship of FIG. 5 between the output of the engine 1 plus the work of the hydraulic actuator 3 and the energy component as set by the third setting means, the energy component is next calculated from the output of the engine 1 and the work of the hydraulic actuator 3 as calculated in step 1 (step 2). Based on the relationship of FIG. 3 between the flow rate through the oil cooler 9 and the energy component as set by the first setting means, the flow rate through the oil cooler 9 is then calculated from the energy component calculated in step 2 (step 3). Based on the relationship of FIG. 4 between the flow rate through the oil cooler 9 and the flow rate through the flow rate control valve 11 as set by the second setting means, the flow rate through the flow rate control valve 11 is next calculated from the flow rate through the oil cooler 9 as calculated in step 3 (step 4). The control signal corresponding to the flow rate through the flow rate control valve 11 as calculated in step 4 is finally outputted to the flow rate control valve 11 (step 5). As a consequence, the flow rate control valve 11 is controlled in its opening area as needed, and the return oil, which has flowed from the hydraulic actuator 3 via the passage 6 and return passage 7, flows to the oil cooler 9 through the cooling passage 8 and also flows in part such that it passes through the flow rate control valve 11 by way of the non-cooling passage 10. Now, it is to be noted that the relationship between the flow rate through the oil cooler 9 and the amount of heat radiation from the oil cooler 9 is experimentally or empirically known to be indicated as illustrated in FIG. 2 mentioned above. In other words, it is known that the amount of heat radiation from the oil cooler 9 can be controlled by changing the flow rate through the oil cooler 9.

According to the first embodiment constructed as described above, the energy component for use in the computation at the control unit, specifically the energy component based on the output from the engine 1 and the work of the hydraulic actuator 3 is equivalent to the experimentally or empirically known amount of heat radiation from the oil cooler 9. Therefore, the value of the control signal that controls the flow rate control valve 11 is a value that does not cause a time lag. It is hence possible to control fluctuations small in the temperature of hydraulic oil. As a consequence, fluctuations in the viscosity of hydraulic oil can be controlled small, and operational stabilization of the hydraulic pump 2 and hydraulic actuator 3 can be realized.

Figure 7:
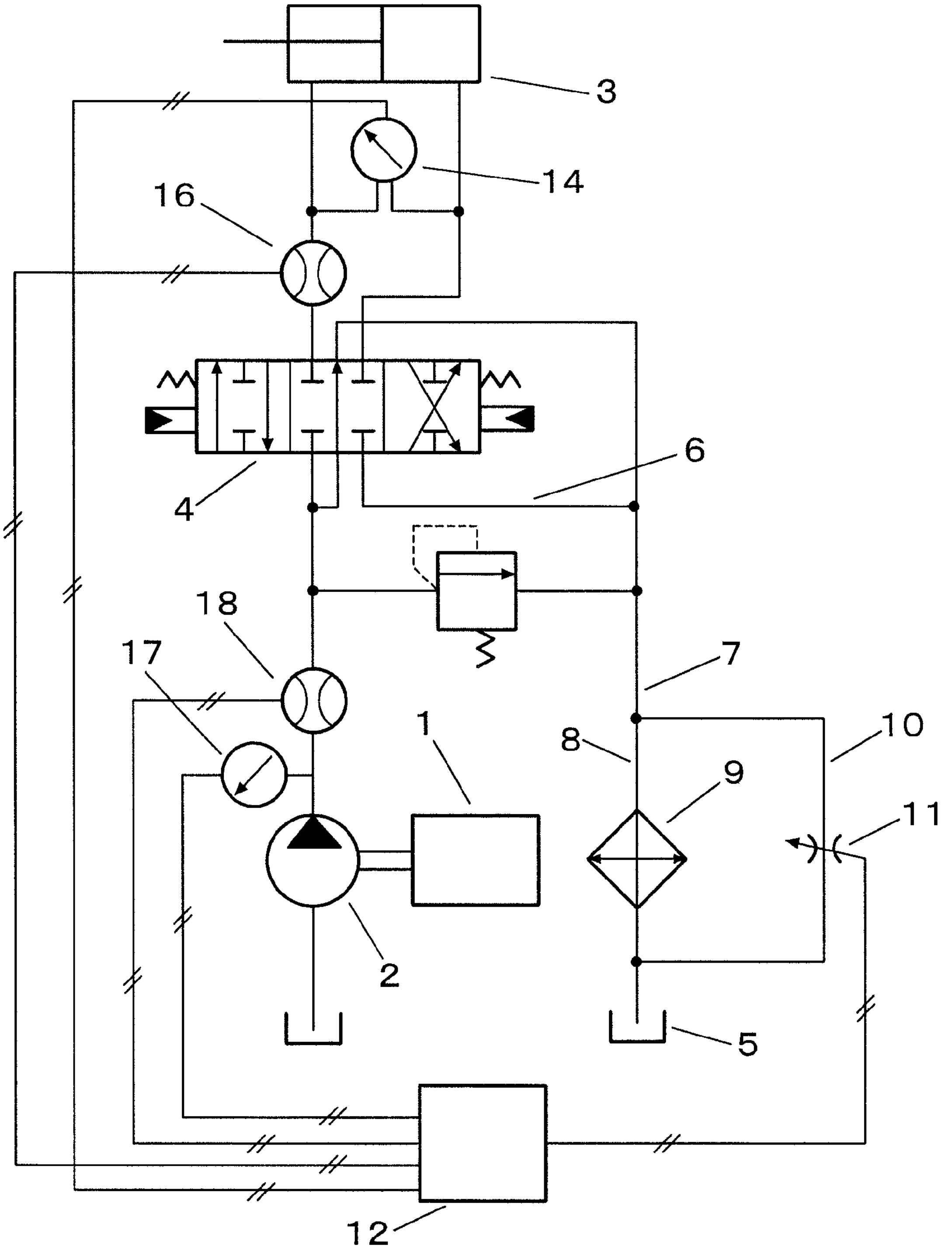
FIG. 7 is a hydraulic circuit diagram showing a second embodiment of the present invention.
Figure 8:
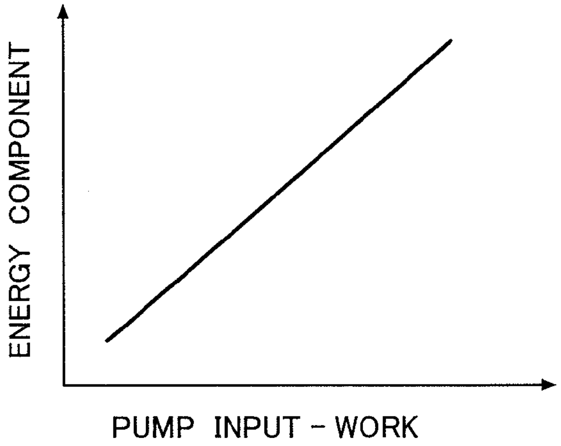
FIG. 8 is a diagram illustrating a relationship between an input to a hydraulic pump plus the work of the hydraulic actuator and the energy component, which heats hydraulic oil, as set by a fourth setting means included in a control unit arranged in the second embodiment.
Figure 9:
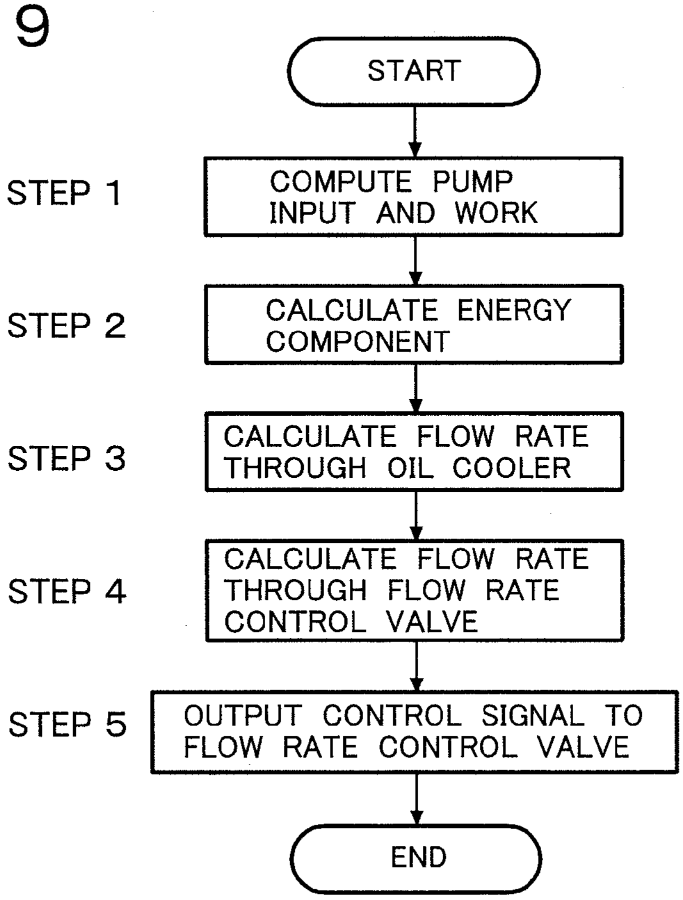
FIG. 9 is a flow chart depicting a processing procedure at the control unit arranged in the second embodiment.

FIG. 7 is a hydraulic circuit diagram showing a second embodiment of the present invention, FIG. 8 is a diagram illustrating a relationship between an input to a hydraulic pump plus the work of the actuator and the energy component, which heats hydraulic oil, asset by a fourth setting means included in a control unit arranged in the second embodiment, and FIG. 9 is a flow chart depicting a processing procedure at the control unit arranged in the second embodiment.

The second embodiment shown in FIG. 7 is provided, in place of the sensor 15 for sensing a displacement of the hydraulic actuator 3 in the first embodiment of FIG. 1, with a flow rate sensor 16 for sensing a flow rate of hydraulic oil through the hydraulic actuator 3, and in place of the sensor 13 for sensing a torque and rotational speed of the engine 1 in the first embodiment of FIG. 1, also with a pressure sensor 17 for sensing a delivery pressure of the hydraulic pump 2 and a flow rate sensor 18 for sensing a delivery flow rate of the hydraulic pump 2. These sensors 16,17,18 are connected to the control unit 12.

The control unit 12 arranged in the second embodiment includes a fifth computing means for determining work of the hydraulic actuator based on the sensors 14,16, a sixth computing means for determining an input to the hydraulic pump 2 based on sensed values of the pressure sensor 17 and flow rate sensor 18, and a fourth setting means for setting a fifth relationship of FIG. 8 between the work of the hydraulic actuator 3 as determined by the fifth computing means plus the input to the hydraulic pump 2 as determined by the sixth computing means and the energy component. In this second embodiment, the above-mentioned first computing means of the control unit 12 is configured to determine the energy component based on the work of the hydraulic actuator 3 as determined by the fifth computing means, the input to the hydraulic pump 2 as determined by the sixth computing means, and the fifth relationship set by the fourth setting means. The remaining construction is equal to that of the first embodiment.

Comparing with the flow chart of the first embodiment as depicted in FIG. 6, this second embodiment is different only in the details of steps 1 and 2 as depicted in FIG. 9. Described specifically, instead of computing the output from the engine 1 and the work of the hydraulic actuator 3 in the first embodiment, the input to the hydraulic pump 2 is computed based on the sensed values of the pressure sensor 17 and flow rate sensor 18 and efficiency data of the hydraulic pump 2 in the second embodiment (step 1). Based on the relationship of FIG. 8 between the work of the hydraulic actuator 3 plus the input to the hydraulic pump 2 and the energy component as set by the fourth setting means, the energy component is calculated from the work of the hydraulic actuator 3 and the input to the hydraulic pump 2 as calculated in step 1 (step 2). The processings in steps 3, 4 and 5 are equal to the corresponding processings in the first embodiment.

Similar to the first embodiment, the second embodiment constructed as described above is also configured to control the flow rate control valve 11 according to the energy component set equal to the amount of heat radiation from the oil cooler 9, in other words, the energy component based on the input to the hydraulic pump 2 and the work of the hydraulic actuator 3 and the second relationship of FIG. 3 as set by the first setting means. The second embodiment can, therefore, bring about similar effects as the first embodiment.

LEGEND

1 Engine
2 Hydraulic pump
3 Hydraulic actuator
4 Directional control valve
5 Hydraulic oil reservoir
6 Passage
7 Return passage
8 Cooling passage
9 Oil cooler
10 Non-cooling passage
11 Flow rate control valve
12 Control unit (first computing means, first setting means, second computing means, second setting means, third computing means, output means, fourth computing means, fifth computing means, third setting means, sixth computing means, fourth setting means)
13 Sensor
14 Pressure sensor
15 Displacement sensor
16 Flow rate sensor
17 Pressure sensor
18 Flow rate sensor

The invention claimed is:

1. A hydraulic oil temperature control system for hydraulically-driven equipment, comprising:

an engine;

a hydraulic pump drivable by the engine;

a hydraulic actuator drivable by pressure oil delivered from the hydraulic pump;

a directional control valve configured to control a flow of pressure oil to be fed to the hydraulic actuator;

a return passage communicating the directional control valve and a hydraulic oil reservoir with each other to guide return oil from the hydraulic actuator to the hydraulic oil reservoir;

an oil cooler arranged in the return passage;

a non-cooling passage bypassing the oil cooler arranged in the return passage;

a flow rate control valve that is arranged in the non-cooling passage and that is configured to control a flow rate of hydraulic oil flowing through the non-cooling passage; and a control unit configured to output a control signal that controls the flow rate control valve, wherein the control unit computes an energy component that heats the hydraulic oil based on an output of the engine and work of the hydraulic actuator, computes a flow rate through the oil cooler based on the energy component that heats the hydraulic oil, and computes a flow rate through the flow rate control valve based on the flow rate through the oil cooler to output to the flow rate control valve a control signal corresponding to the flow rate through the flow rate control valve.

2. A hydraulic oil temperature control system for hydraulically-driven equipment, comprising:

an engine;

a hydraulic pump drivable by the engine;

a hydraulic actuator drivable by pressure oil delivered from the hydraulic pump;

a directional control valve configured to control a flow of pressure oil to be fed to the hydraulic actuator;

a return passage communicating the directional control valve and a hydraulic oil reservoir with each other to guide return oil from the hydraulic actuator to the hydraulic oil reservoir;

an oil cooler arranged in the return passage;

a non-cooling passage bypassing the oil cooler arranged in the return passage;

a flow rate control valve that is arranged in the non-cooling passage and that is configured to control a flow rate of hydraulic oil flowing through the non-cooling passage; and a control unit configured to output a control signal that controls the flow rate control valve, wherein the control unit computes an energy component that heats the hydraulic oil based on work of the hydraulic actuator and an input to the hydraulic pump, computes a flow rate through the oil cooler based on the energy component that heats the hydraulic oil, and computes a flow rate through the flow rate control valve based on the flow rate through the oil cooler to output to the flow rate control valve a control signal corresponding to the flow rate through the flow rate control valve.

* * * * *